April 21, 1959 C. W. MUSSER 2,883,150
STRAIN WAVE ROTARY VALVE
Filed May 31, 1957

INVENTOR
C. Walton Musser
BY
ATTORNEYS

United States Patent Office 2,883,150
Patented Apr. 21, 1959

2,883,150

STRAIN WAVE ROTARY VALVE

C Walton Musser, Beverly, Mass., assignor to United Shoe Machinery Corporation, Flemington, N.J., a corporation of New Jersey Application May 31, 1957, Serial No. 662,743

5 Claims. (Cl. 251—340)

The present invention relates to valves of the character which are operated from outside a hermetically sealed or closed wall without need for a stuffing box.

A purpose of the invention is to balance the operating forces on a rotary valve manipulated through a deflectable wall.

A further purpose is to obtain higher torque capabilities in operating a rotary valve through a deflectable wall.

A further purpose is to secure relatively low tooth contact pressure and thus minimize the tendency to excessive load concentrations on certain portions of gear teeth which are operated from outside a deflectable wall.

A further purpose is to manufacture an operating mechanism for a rotary valve which is of very small size and correspondingly very light.

A further purpose is to employ in a rotary valve a housing, a valve seat in the housing having a valve port, a rotary valve cooperating with the valve seat having a valve passage which in one position communicates with the valve port and in another position is closed by the valve seat, gear teeth on the outside of the valve concentric therewith, a deflectable wall surrounding the rotary valve, and connected at the ends with the housing, gear teeth at the inside of the deflectable wall of the same size as the gear teeth on the outside of the valve, concentric therewith and deflectable, the gear teeth on the deflectable wall being at two or more points around the circumference in radial clearance outside the gear teeth on the valve, and a strain inducer operative to deflect the deflectable wall and the gear associated therewith and maintain it in mating relation of its teeth with the teeth on the outside of the valve on the concentric axis at a plurality of circumferentially spaced positions interspersed by nonmating positions, the strain inducer changing its position around the periphery of the deflectable wall and therefore propagating a strain wave around the periphery of the deflectable wall and causing rotation of the valve.

A further purpose is to utilize an antifriction bearing as a strain inducer, preferably providing an elliptical race with bearing elements interposed between the strain inducer and the outside of the deflectable wall and applying pressure on the deflectable wall.

A further purpose is to utilize two or optionally three lobes on the strain inducer and obtain two or three equally circumferentially spaced mating positions of the gear.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 1:
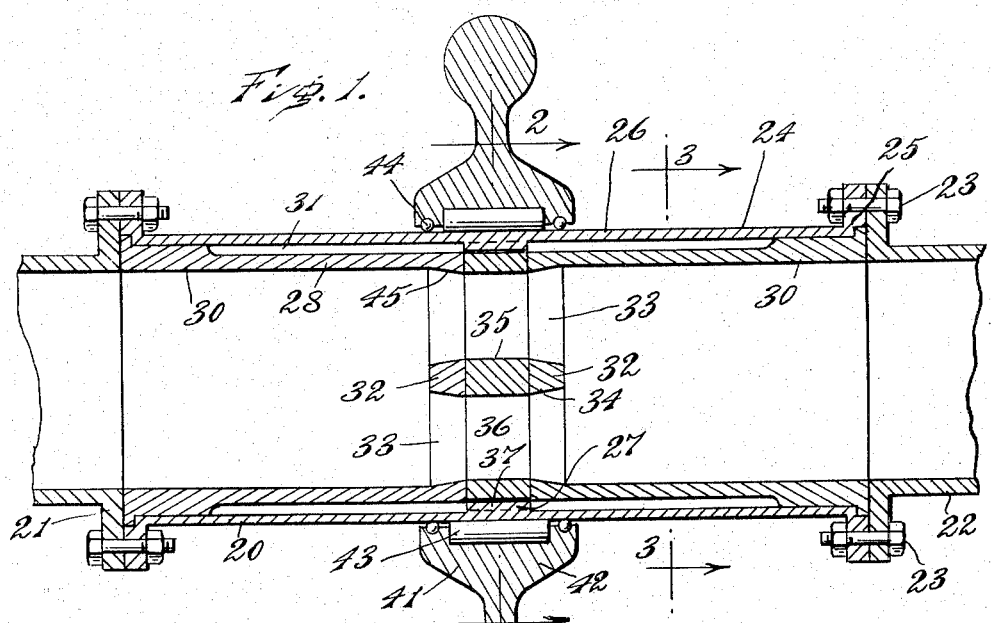
Figure 1 is an axial section partly diagrammatic of a rotary valve according to the invention.

Describing in illustration but not in limitation and referring to the drawings:

In many industries it is very desirable to be able to close a valve from outside a pipe, housing or vessel, without the need to employ a stuffing box or gain access to the interior. This is particularly important where the contents of the pipe or vessel are likely to be contaminated by exposure to the atmosphere, or where such contents are dangerous to personnel. Numerous examples of this kind occur in the chemical industries, and in the field of power generation from steam or other hot media.

Many of the prior methods of manipulating valves from outside have been objectionable either because they necessitated a very thin and fragile diaphragm or wall through which the motion was transmitted, or else because the frictional losses were excessive, the amount of force which could be transmitted was limited, or the motion was not sufficiently precisely controlled.

The present invention offers a number of advantages over prior art devices. The structure is extremely sturdy, and while a deflectable wall is used, it can be quite substantial in thickness and strength. The force available to produce motion of the valve on the inside of the pipe or housing is relatively high, and no difficulty arises through limitation in available force.

The motion transmitted is quite precise and it is possible to observe accurately from outside the exact position of the valve inside the pipe or housing.

Wear is reduced to a minimum and therefore problems of lubrication are simplified.

Figure 2:
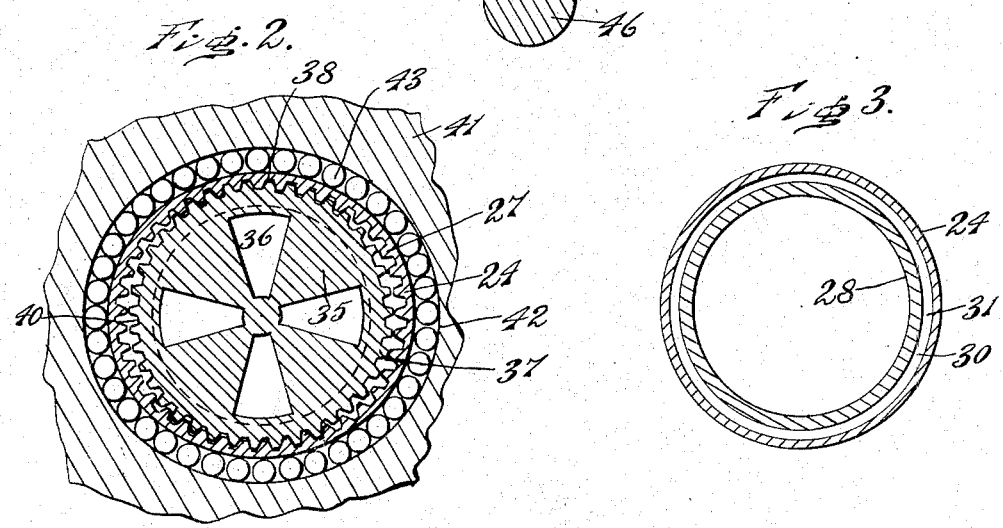
Figure 2 is a section on the line 2—2 of Figure 1.
Figure 3:
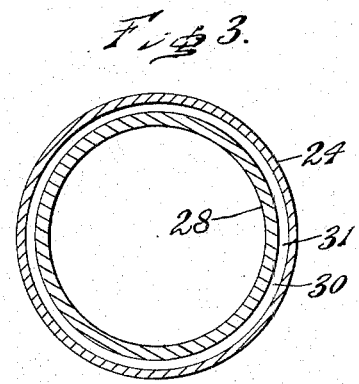
Figure 3 is a section on the line 3—3 of Figure 1.

I illustrate in Figures 1 to 3 a suitable valve system 20 connected at opposite ends to pipe sections 21 and 22 by flanged joints by means of bolts 23.

The valve system comprises a deflectable wall 24 of tubular cross section, which may be of any suitable metallic material such as plain carbon, low alloy or stainless steel, bronze, Nichrome or of plastic such as nylon or polytetrafluorethylene, having flanges 25 at the opposite ends which connect to the adjoining pipe sections, having a deflectable wall portion 26 which is thin enough to deform readily, but may of course be of very substantial thickness depending on the diameter, and having preferably near the middle a strain gear 27 provided with internal teeth. The question of whether the strain gear is integral with the deflectable wall as shown, or is separately provided against the inside of the deflectable wall is unimportant from the standpoint of the present invention.

On the inside of the deflectable wall 24 are valve housings 28 having enlarged portions 30 at the ends which fit close against the flanges 25, and having clearance space at 31 between the outside of the housing and the inside of the deflectable wall to permit deflection of the wall. At adjoining ends the housings mount valve seats 32 provided with valve ports 33 suitably distributed around the circumference and separated by valve seat spiders 34.

The valve seats are in spaced relation and guide a rotary valve 35 placed between the two seats transverse to the axis of the valve system and provided with a series of valve passages 36 which in one circumferential position of the valve cooperate with the seat ports 33 and in another circumferential position fully close the seat ports, as well known.

The rotary valve is coaxial with respect to the tubular deflectable wall, and has at the outer periphery a gear 37 whose teeth are of the same form as the teeth on the gear 27. In unstrained position, the teeth on the gear 27 are larger in radial diameter, but are deformed by deforming the tubular wall so that at points 38, at spaced positions around the circumference, the inner and outer teeth are in engagement, and at intermediate points 40 at spaced positions around the circumference the inner and outer teeth are out of engagement and out of mesh.

In the simple case shown in Figure 2, there are two diametrally opposite points of engagement 38, but it will be evident that there may be three or in some cases more points of engagement equally circumferentially spaced around the valve.

It will be understood that the teeth on the gears 27 and 37 will desirably extend axially and at the same diametral pitch, but with a slightly smaller pitch diameter on the inner gear. This difference in pitch diameter is caused by the fact that the number of teeth on the inner gear is less than the number of teeth on the outer gear. The difference in the number of teeth between the two gears or the tooth differential should be equal to or a multiple of the number of places at which the strain gear is deflected to cause tooth engagement with the ring gear.

The straining of the gear 27 and the deflectable wall to cause engagement at these spaced points is accomplished by a strain inducing element 41 which surrounds the gear 27 and the deflectable wall.

In the preferred embodiment the strain inducing element comprises a bearing race 42 having an elliptical interior bearing channel as shown in Figure 2 and a series of anifriction elements here shown as rollers 43 distributed around the race and engaging the outside of the deflectable wall 24. Suitable oil seals are provided between the race and the deflectable wall at 44.

If desired, limiters (not shown) may be provided to prevent the strain inducing element from moving axially.

In order to increase the flow area through the valve, the valve cross section can be made perceptibly larger than the cross section of the pipes at either end as well known. Also the ports are suitably bell-mouthed at 45 to improve flow.

It will be evident, of course, that the sealing action takes place between the valve and the valve seat chiefly on the down flow side, and the pressure in the fluid when the valve is closed aids in maintaining a tight seal.

Any suitable index may be provided on the strain inducer cooperating with an index on the outside of the deflectable wall to indicate the valve position by turning the race. The manner in which the strain inducer 41 is turned will depend upon the particular illustration. As shown a hand wheel 46 is provided, but it will be understood that where desired the strain inducer can be power driven as by providing gear teeth, or making it the rotor of an electric motor.

The numerous variations in strain wave gearing which may be incorporated in the present invention are shown in my copending application Serial No. 495,479, filed March 21, 1955, for Strain Wave Gearing, which is incorporated herein by reference.

While an antifriction bearing form of strain inducer has been shown, it will be understood, of course, that the elliptical surface on the strain inducer can bear directly against the deflectable wall if desired, as shown in my application above referred to.

It will be evident that the number of teeth in contact at all times tends to distribute the wear over all the teeth, even though the device turns less than one complete revolution. Since all of the forces necessary to produce torque are distributed at the pitch lines of both gears at a number of equal points equal to the number of lobes on the strain inducer, they tend to balance out and become equal. This effectively prevents any radial forces from being applied to the valve and displacing the valve radially.

The device has a surprisingly large torque-producing capability. Thus even though the frictional engagement between the valve and its seat may be high, it is possible to transmit very large forces without damage to the deflectable wall in order to move the valve in either direction.

The device of the invention has large force transmitting capacity for small size, and need add little to the weight of the equipment. It is thus possible to construct the device in a very compact and relatively inexpensive form.

In view of my invention and disclosure variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a valve, a casing, a valve seat in the casing having a valve port, a rotary valve cooperating with the valve seat and having a valve passage which in one rotary position communicates with the port in the seat and in another position closes the port in the seat, a ring gear on the outside of the valve, a deformable wall surrounding the ring gear, connected at the ends with the casing, and having gear teeth at the inside of the same size as the gear teeth on the valve, concentric therewith and spaced therefrom at points around the circumference, there being more teeth on the deformable wall than on the valve, and a strain inducing element operative to deflect the gear teeth on the deformable wall into mating relation with the gear teeth on the valve on the concentric axis at a plurality of circumferentially spaced positions interspersed by nonmating positions, whereby rotation of the strain inducing element relative to the periphery of the deformable wall will propagate a strain wave around the periphery and cause turning of the valve.

2. A valve of claim 1, in which the strain inducing element comprises an antifriction bearing applying radial pressure to the outside of the deformable wall.

3. A valve of claim 1, in which the strain inducing element comprises a bearing race of elliptical contour, and antifriction bearing elements in the race applying pressure to the outside of the deformable wall.

4. A valve of claim 1, in which the gear teeth on the deformable wall come into mating relation with the gear teeth on the valve at two positions which are diametrally opposite.

5. A valve of claim 1, in which the casing extends over part of its length in spaced relation with the deformable wall and forms guides for the rotary valve in its rotational motion.

No references cited.